United States Patent [19]

Hara

[11] Patent Number: 5,065,337

[45] Date of Patent: Nov. 12, 1991

[54] VERTICAL REVOLUTE JOINT ROBOT

[75] Inventor: Ryuichi Hara, Yamanashi, Japan

[73] Assignee: Fanuc Ltd., Minamitsuru, Japan

[21] Appl. No.: 474,032

[22] PCT Filed: Aug. 31, 1989

[86] PCT No.: PCT/JP89/00897

§ 371 Date: Apr. 18, 1990

§ 102(e) Date: Apr. 18, 1990

[87] PCT Pub. No.: WO90/02028

PCT Pub. Date: Mar. 8, 1990

[30] Foreign Application Priority Data

Aug. 31, 1988 [JP] Japan .................... 63-214785

[51] Int. Cl.$^5$ .................................................. G05B 19/40
[52] U.S. Cl. ......................................... 364/513; 901/15
[58] Field of Search ................ 364/513; 901/15, 17, 901/18

[56] References Cited

U.S. PATENT DOCUMENTS

| | | | |
|---|---|---|---|
| 4,456,961 | 6/1984 | Price et al. ................ | 364/513 |
| 4,623,971 | 11/1986 | Ailman et al. ............. | 364/513 |
| 4,680,519 | 7/1987 | Chand et al. .............. | 364/513 |
| 4,823,279 | 4/1989 | Perzley et al. ............ | 364/513 |
| 4,831,547 | 5/1989 | Ishiguro et al. ........... | 364/513 |

FOREIGN PATENT DOCUMENTS 0158447  10/1985  European Pat. Off. ............ 364/513

*Primary Examiner*—Allen R. MacDonald

*Attorney, Agent, or Firm*—Staas & Halsey

[57] ABSTRACT

A vertical revolute joint robot having an offset wrist, which is capable of rapidly calculating respective joint angles on the basis of a target position and orientation of an end effector, and hence is excellent in operation accuracy.

A robot arm consists of first to third links, and the joint axis (Y0) of a first joint (1), which couples a base fixedly disposed within an operation space to the first link, extends perpendicularly to the axis of the base, whereas the joint axis (Z1) of a second joint (2), which couples the first and second links to each other, extends along the axis of the first link. The third link is mounted with a wrist offset relative to the arm, and an end effector is mounted on the offset wrist. A computer provided in the robot calculates a fist joint angle ($\theta_1$) in accordance with an arithmetic equation, which is fulfilled between corresponding ones of transformation matrices employed for coordinate transformation among zeroth to sixth coordinate systems respectively set for first to sixth joints (1)-(6) and an end effector mounting face center, the equation being represented as a function of vector components indicative of the position of the origin of the sixth coordinate system with respect to the zeroth coordinate system and determinable from target position and orientation of the end effector, link lengths determined in dependence on the robot arrangement, and offset distances (d2-d4). The computer calculates other joint angles ($\theta_2$-$\theta_6$) in accordance with similar arithmetic equations.

7 Claims, 4 Drawing Sheets

VERTICAL REVOLUTE JOINT ROBOT

BACKGROUND OF THE INVENTION

1. Field of the Invention

The present invention relates to a vertical revolute joint robot having an offset wrist, and more particularly, to a robot of this kind which is capable of rapidly calculating joint angles and excellent in operation accuracy.

2. Description of the Related Art

A typical six-axis vertical revolute joint robot comprises a robot body having an arm which consists of three links and a wrist consisting of three links. In this robot, a base fixed in a robot operation space is coupled to a link disposed on the side facing the base and adjacent ones of the links are coupled to each other by means of revolute joints, respectively, so as to permit an end effector mounted to the wrist to assume its arbitrary position and orientation. In order to control the position and orientation of the end effector to perform various operations, the robot comprises a computer for calculating target values of respective joint angles of first to sixth revolute joints on the basis of target position and orientation of the end effector so as to attain the target position and orientation, and a servo system for controlling the respective joint angles to the target values (here, the numbers specifiying the links and the revolute joints increase in sequential order outward from the base-side).

In the case of a so-called in-line wrist having three axes thereof crossing each other at a single point, the respective joint angles are derived from the position and orientation of the end effector in such a manner that the joint angle of the first revolute joint (hereinafter, the joint angle of the i-th (i=1-6) revolute joint is referred to as i-th joint angle) is first calculated, which angle is represented as a function solely of the position and orientation of the end effector, and then the respective i-th joint angle, represented as a function of the joint angle(s) previously calculated, such as the first joint angle, is calculated in sequence.

On the contrary, in the case of an offset wrist having three axes thereof not crossing each other at a single point and being offset relative to the arm, the first joint angle is not given at a function solely of the position and orientation of the end effector, and hence changes in dependence even on the fourth joint angle. Thus, the first joint angle is first calculated based upon a temporal initial value of the fourth joint angle. Then, a procedure of calculating the second to fourth joint angles and the first joint angle based on the first to fourth joint angles is repeatedly carried out until the thus calculated fourth joint angle converges.

In order to move the end effector along a predetermined path, with its orientation controlled to a target orientation, the robot periodically calculates the position and orientation of the end effector. In this respect, a calculation interval (interpolation period) for calculating the position and orientation of the end effector must be shortened. However, in the robot having the offset wrist, tremendous arithmetic operations must be made for calculation of the joint angles, as mentioned above. Accordingly, a required arithmetic time period is prolonged, resulting in a prolonged interpolation period. This makes it difficult to improve operation accuracy.

SUMMARY OF THE INVENTION

The object of the present invention is to provide a vertical revolute joint robot having an offset wrist, which is capable of rapidly calculating respective joint angles on the basis of a target position and orientation of an end effector, and hence is excellent in operation accuracy.

In order to achieve the above-mentioned object, according to the present invention, there is provided a vertical revolute joint robot which comprises an arm having a first link coupled through a first revolute joint to a base fixedly disposed in an operation space, a second link coupled through a second revolute joint to the first link, and a third link coupled through a third revolute joint to the second link. The robot further comprises an offset wrist mounted to the arm and having plural revolute joints whose respective joint axes do not cross each other at a single point and arranged to be mounted with an end effector, and a control section for calculating joint angles of the respective revolute joints on the basis of a target position and orientation of the end effector. The first and second revolute joints have their joint axes which respectively extend perpendicular to an axis of the base and along an axis of the first link. The control section operates to calculate the joint angle of the first revolute joint which is given as a function solely of the target position and orientation of the end effector and the calculate the joint angle of each of the revolute joints other than the first revolute joint on the basis of previously calculated joint angles.

As mentioned above, according to the present invention, the first and second revolute joints of the vertical revolute joint robot having the offset wrist are so disposed that the joint axes of these joints respectively extend along the axial direction of the base and the first link, and the joint angle of the first revolute joint given as a function solely of the target position and orientation of the end effector is calculated, and further the other joint angles are calculated on the basis of the previously calculated joint angles. Accordingly, repetitive calculation for calculating the joint angles, heretofore inevitably required in robots of this kind, can be eliminated. This makes is possible to reduce an arithmetic quantity for calculation of the joint angles and a required arithmetic time period therefor. Thus, a calculation interval (interpolation period) for calculation of the position and orientation of the end effector can be shortened, to thereby improve the robot operation accuracy.

DESCRIPTION OF THE PREFERRED EMBODIMENTS

Prior to an explanation of the present invention, a conventional six-axis vertical revolute joint robot having an offset wrist will be first explained.

In position and orientation control of an end effector, respective joint angles are controlled to target joint angles calculated on the basis of target values of the position and orientation of the end effector. In order to calculate the target joint angles, a coordinate transformation matrix is employed by which an operational coordinate system, set in a robot operation space for indicating the position and orientation of the end effector, is related to coordinate systems set for individual links (joints).

Figure 2:
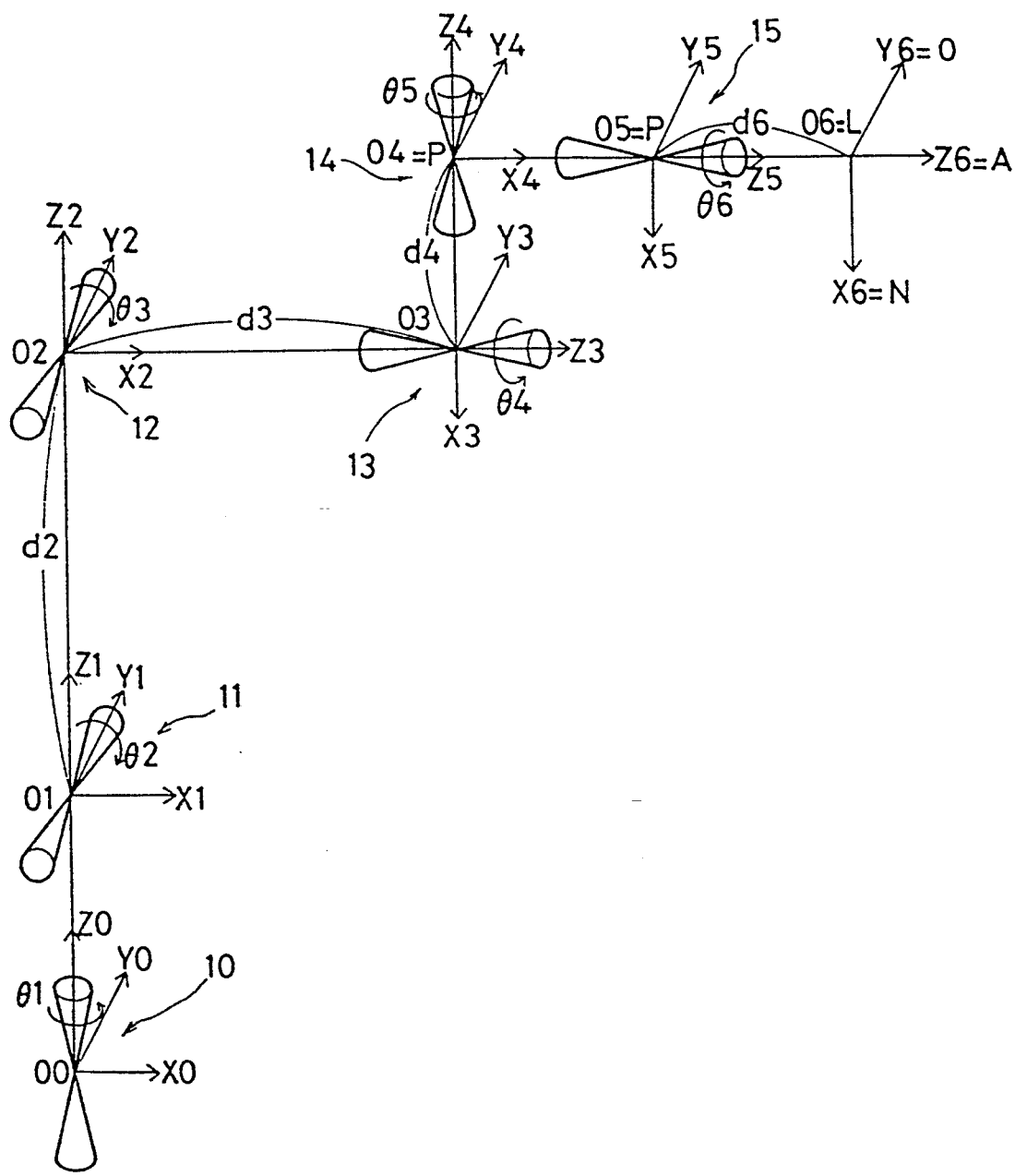
FIG. 2 is a view similar to FIG. 1 showing a conventional robot.

Referring to FIG. 2, the robot comprises first to third revolute joints (hereinafter referred to as joints) 10-12 provided in an arm, and fourth to sixth joints 13-15 provided in a wrist. A base is coupled to the link (first link) disposed at the side facing the base by the first joint 10, and adjacent ones of the first to sixth links are coupled to each other by the second to sixth joints 11-15, respectively. The sixth link is mounted with the end effector. Further, zeroth coordinate system (O0, X0, Y0, Z0), as application oriented coordinate system, and first to sixth coordinate systems (O1, X1, Y1, Z1)-(O6, X6, Y6, Z6) are respectively set for the base and the first to sixth links (the first to sixth joints and the center of a surface on which the end effector is mounted). The joint axis (Z0 axis) of the first joint 10 extends in the axial direction of the base fixed in the robot operation space, and the joint axis (Y1 axis) of the second joint 11 extends perpendicularly to the axis of the first link. Reference symbols Y2, Z3-Z5 denote the joint axes of the third to sixth joints 12-15, respectively.

The following are $4 \times 4$ homogeneous transformation matrices Ai from the (i−1)th coordinate system to the i-th coordinate system, which matrices are utilized to calculate the position and orientation, in the application oriented coordinate system, of the end effector mounting face center on the basis of the joint angles (hereinafter referred to as first to sixth joint angles ) $\theta 1-\theta 6$ of the first to sixth joints 10-15, when such joint angles are given.

$$A1 = \begin{pmatrix} c1 & -s1 & 0 & 0 \\ s1 & c1 & 0 & 0 \\ 0 & 0 & 1 & 0 \\ 0 & 0 & 0 & 1 \end{pmatrix}$$

where c1 and s1 respectively represent $\cos\theta 1$, $\sin\theta 2$ (hereinafter, ci and si represent $\cos\theta i$ and $\sin\theta i$, respectively). The first joint angle $\theta 1$ assumes a positive value when the first joint 10 rotates in the direction shown by the arrow in FIG. 2 (hereinbelow, the i-th joint angle $\theta 1$ also assumes a positive value when the i-th joint rotates in the direction specified by the arrow).

$$A2 = \begin{pmatrix} c2 & 0 & s2 & 0 \\ 0 & 1 & 0 & 0 \\ -s2 & 0 & c2 & 0 \\ 0 & 0 & 0 & 1 \end{pmatrix} \begin{pmatrix} 1 & 0 & 0 & 0 \\ 0 & 1 & 0 & 0 \\ 0 & 0 & 1 & d2 \\ 0 & 0 & 0 & 1 \end{pmatrix} \times$$

$$\begin{pmatrix} \cos(\theta 2) & 0 & \sin(-\theta 2) & 0 \\ 0 & 1 & 0 & 0 \\ -\sin(-\theta 2) & 0 & \cos(-\theta 2) & 0 \\ 0 & 0 & 0 & 1 \end{pmatrix} = \begin{pmatrix} 1 & 0 & 0 & s2d2 \\ 0 & 1 & 0 & 0 \\ 0 & 0 & 1 & c2d2 \\ 0 & 0 & 0 & 1 \end{pmatrix}$$

where d2 represents the axial length of the second link, i.e., the distance between the coordinate origins O1, O2 of the first and second coordinate systems. Hereinbelow, di also denotes the length of the i-th link (the distance between the coordinate origins of the (i−1) and i-th coordinate systems), and d4 denotes the offset distance of the wrist relative to the arm). In the meantime, the coordinate origins O0, O1 of the zeroth and first coordinate systems are set at the same position to each other, and the origins O4, O5 of the fourth and fifth coordinate systems are set at the same position (di=d5=0 (d1 and d5 are not illustrated).

$$A3 = \begin{pmatrix} c3 & 0 & s3 & 0 \\ 0 & 1 & 0 & 0 \\ -s3 & 0 & c3 & 0 \\ 0 & 0 & 0 & 1 \end{pmatrix} \begin{pmatrix} \cos(\pi/2) & 0 & \sin(\pi/2) & 0 \\ 0 & 1 & 0 & 0 \\ -\sin(\pi/2) & 0 & \cos(\pi/2) & 0 \\ 0 & 0 & 0 & 1 \end{pmatrix} \times$$

$$\begin{pmatrix} 1 & 0 & 0 & 0 \\ 0 & 1 & 0 & 0 \\ 0 & 0 & 1 & d3 \\ 0 & 0 & 0 & 1 \end{pmatrix} = \begin{pmatrix} -s3 & 0 & c3 & c3d3 \\ 0 & 1 & 0 & 0 \\ c3 & 0 & -s3 & -s3d3 \\ 0 & 0 & 0 & 1 \end{pmatrix}$$

where the components associated with an angle of $\pi/2$ represent that attention is given to the fact that the third coordinate system is rotated by an angle of $\pi/2$ around the Y2 axis of the second coordinate system (the following description is the same in this respect).

$$A4 = \begin{pmatrix} c4 & -s4 & 0 & 0 \\ s4 & c4 & 0 & 0 \\ 0 & 0 & 1 & 0 \\ 0 & 0 & 0 & 1 \end{pmatrix} \times$$

$$\begin{pmatrix} \cos(-\pi/2) & 0 & \sin(-\pi/2) & 0 \\ 0 & 1 & 0 & 0 \\ -\sin(-\pi/2) & 0 & \cos(-\pi/2) & 0 \\ 0 & 0 & 0 & 1 \end{pmatrix} \begin{pmatrix} 1 & 0 & 0 & 0 \\ 0 & 1 & 0 & 0 \\ 0 & 0 & 0 & d4 \\ 0 & 0 & 0 & 1 \end{pmatrix} =$$

$$\begin{pmatrix} 0 & -s4 & -c4 & -c4d4 \\ 0 & c4 & -s4 & -s4d4 \\ 1 & 0 & 0 & 0 \\ 0 & 0 & 0 & 1 \end{pmatrix}$$

$$A5 = \begin{pmatrix} c5 & -s5 & 0 & 0 \\ s5 & c5 & 0 & 0 \\ 0 & 0 & 1 & 0 \\ 0 & 0 & 0 & 1 \end{pmatrix} \begin{pmatrix} \cos(\pi/2) & 0 & \sin(\pi/2) & 0 \\ 0 & 1 & 0 & 0 \\ -\sin(\pi/2) & 0 & \cos(\pi/2) & 0 \\ 0 & 0 & 0 & 1 \end{pmatrix} =$$

$$\begin{pmatrix} 0 & -s5 & c5 & 0 \\ 0 & c5 & s5 & 0 \\ -1 & 0 & 0 & 0 \\ 0 & 0 & 0 & 1 \end{pmatrix}$$

$$A6 = \begin{pmatrix} c6 & -s6 & 0 & 0 \\ s6 & c6 & 0 & 0 \\ 0 & 0 & 1 & 0 \\ 0 & 0 & 0 & 0 \end{pmatrix}$$

In the following, transformation matrices $^{i-1}T_i$ from the (i−1)th coordinate system to the i-th coordinate system will be shown, which are employed for calculation of the first to sixth joint angles $\theta 1- \theta 6$ based on the position and orientation of the end effector mounting face center, if such position and orientation of the mounting face center are given.

$$^5T_6 = A6 = \begin{pmatrix} c6 & -s6 & 0 & 0 \\ s6 & c6 & 0 & 0 \\ 0 & 0 & 1 & 0 \\ 0 & 0 & 0 & 1 \end{pmatrix} \quad (1)$$

$$^4T_6 = A5\,^5T_6 = \begin{pmatrix} -s5s6 & -s5c6 & c5 & 0 \\ c5s6 & c5c6 & s5 & 0 \\ -c6 & s6 & 0 & 0 \\ 0 & 0 & 0 & 1 \end{pmatrix}$$

$$^3T_6 = A4\,^4T_6 = \begin{pmatrix} -s4c5s6 + c4c6 & -s4c5c6 - c4s6 & -s4s5 & -c4d4 \\ c4c5s6 + s4c6 & c4c5c6 - s4s6 & c4s5 & -s4d4) \\ -s5s6 & -s5c6 & c5 & 0 \\ 0 & 0 & 0 & 1 \end{pmatrix}$$

$$^2T_6 = A3\,^3T_6 = \begin{pmatrix} s3(s4c5s6 - c4c6) - c3s5s6 & s3(s4c5c6 + c4s6) - c3s5c6 & s3s4s5 + c3c5 & c3d3 + s3c4d4 \\ c4c5s6 + s4c6 & c4c5c6 - s4s6 & c4s5 & -s4d4 \\ c3(s4c5s6 - c4c6) + s3s5s6 & c3(s4c5c6 + c4s6) + s3s5c6 & c3s4s5 - s3c5 & -s3d3 + c3c4d4 \\ 0 & 0 & 0 & 1 \end{pmatrix}$$

$$^1T_6 = A2\,^2T_6 = \begin{pmatrix} s3(s4c5s6 - c4c6) - c3s5s6 & s3(s4c5c6 + c4s6) - c3s5c6 & s3s4s5 + c3c5 & s2d2 + c3d3 + s3c4d4 \\ c4c5s6 + s4c6 & c4c5c6 - s4s6 & c4s5 & -s4d4 \\ c3(s4c5s6 - c4c6) + s3s5s6 & c3(s4c5c6 + c4s6) + s3s5c6 & c3s4s5 - s3c5 & c2d2 - s3d3 + c3c4d4 \\ 0 & 0 & 0 & 1 \end{pmatrix} \quad (2)$$

$$^0T_6 = A1\,^1T_6 = \begin{pmatrix} nx & ox & ax & px \\ ny & oy & ay & py \\ nz & oz & az & pz \\ 0 & 0 & 0 & 1 \end{pmatrix}$$

where $n(nx, ny, nz)$, $o(ox, oy, oz)$ and $a(ax, ay, az)$ represent normal vector, orientation vector and approach vector, respectively, and respective vector components are represented as follows:

$nx = c1\{s3(s4c5s6 - c4c6) - c3s5s6\} - s1(c4c5s6 + s4c6)$
$ny = s1\{s3(s4c5s6 - c4c6) - c3s5s6\} + c1(c4c5s6 + s4c6)$
$nz = c3(s4c5s6 - c4c6) + s3s5s6$
$ox = c1\{s3(s4c5c6 + c4s6) - c3s5s6\} - s1(c4c5c6 - s4c6)$
$oy = s1\{s3(s4c5c6 + c4s6) - c3s5s6\} + c1(c4c5c6 - s4c6)$
$oz = c3(s4c5c6 + c4s6) + s3s5c6$
$ax = c1(s3s4s5 + c3c5) - s1c4s5$
$ay = s1(s3s4s5 + c3c5) + c1c4s5$
$az = c3s4s5 - s3c5$
$px = c1(s2d2 + c3d3 + s3c4d4) + s1s4d4$
$py = s1(s2d2 + c3d3 + s3c4d4) - c1s4d4$
$pz = c2d2 - s3d3 + c3cd4d$

Conventionally, the joint angles $\theta 1-\theta 6$ are determined by utilizing the transformation matrices $^{i-1}T_i$ obtained in the above-mentioned manner. First, it is noted that the following equation is fulfilled among the inverse matrix $[A1]^{-1}$ of the aforesaid transformation matrix $A1$ and the aforesaid transformation matrices $^0T_6$, $^1T_6$.

$$[A1]^{-1}\,^0T_6 = \,^1T_6 \quad (3)$$

Left-hand side =

$$\begin{pmatrix} c1nx + s1ny & c1ox + s1oy & c1ax + s1ay & c1px + s1py \\ -s1ny + c1ny & -s1ox + c1oy & -s1ax + c1ay & -s1px + c1py \\ nz & oz & az & pz \\ 0 & 0 & 0 & 1 \end{pmatrix}$$

If matrix elements in second row, fourth column on the both sides of the aforesaid equation (3) are equal to each other, the following equation is fulfilled (see, equation (2) for the right-hand side).

$$-s1px + c1py = -s4d4 \quad (4)$$

As apparent from equation (4), the first joint angle $\theta 1$ varies in dependence on the fourth joint angle $\theta$. Thus, even if the aforesaid various vectors $n$, $o$, $a$ indicative of the orientation of the end effector mounting face center and the location vector $l(lx, ly, lz)$ indicative of the position of the end effector mounting face center are given, it is impossible to instantly calculate the first joint angle $\theta 1$ based on these parameters. Therefore, conventionally, the first joint angle $\theta 1$ represented by the following equation is determined by giving a temporal initial value of the fourth joint angle $\theta 4$.

$$\theta 1 = atan2(py, px) - atan2\{-s4d4, \pm(px^2 + py^2 - s4^2d4^2)^{\frac{1}{2}}\}$$

where atan2(y, x) is the expanded function or arc tangent function o $tan^{-1}y/x$, which assumes values varying from $-\pi$ to $\pi$ in dependence on signs of variables $x$ and $y$.

Then, the joint angle $\theta 1$ represented by the aforementioned equation is determined by using the relationship $P = 1 - d6a$ ($px = lx - axd6$, $py - ly - ayd6$, $pz = lz - azd6$) established among the vector $p(px, py, pz)$ indicative of the position of the origin of the sixth coordinate system in the zeroth coordinate system, the aforesaid vectors l, a and the length d6 of the sixth link.

Further, the following equations are fulfilled between the aforementioned inverse matrix $[Ai]^{-1}$ of the transformation matrix $Ai$ and the transformation matrix $^{i-1}T_i$.

$$[A2]^{-1}[A1]^{-1} {}^0T_6 = {}^2T_6$$

$$[A3]^{-1}[A2]^{-1}[A1]^{-1} {}^0T_6 = {}^3T_6$$

$$[A4]^{-1}[A3]^{-1}[A2]^{-1}[A1]^{-1} {}^0T_6 = {}^4T_6$$

$$[A5]^{-1}[A4]^{-1}[A3]^{-1}[A2]^{-1}[A1]^{-1} {}^0T_6 = {}^5T_6$$

Thus, temporal values of the second to fourth joint angles $\theta 2 - \theta 4$ are calculated on the basis of the relationships established among matrix elements in appropriate rows and columns of the both sides of the above-mentioned equation and the temporally determined first joint angle $\theta 1$. Whereupon, the joint angle $\theta 1$ given by the expanded function is determined again on the basis of the calculated value of the joint angle $\theta 4$. Then, this procedure is repeated until the joint angle $\theta 4$ converges, to thereby determine the joint angle $\theta 1 - \theta 4$. Thereafter, the fifth and sixth joint angles $\theta 5$ and $\theta 6$ are determined.

In this manner, according to the prior art vertical revolute joint robot, tremendous arithmetical operations are required for calculation of the joint angles, resulting in inconvenience. Meanwhile, in vertical revolute joint robots having an in-line wrist, equation $-slpx + clpy = 0$ corresponding to the aforesaid equation (4) is fulfilled. Thus, the first joint angle $\theta 1$ is represented by a function solely of the position and orientation of the end effector, and no inconvenience in calculating the joint angles is found.

In the following, a six-axis vertical revolute joint robot having an offset wrist according to the present invention will be explained.

Figure 1:
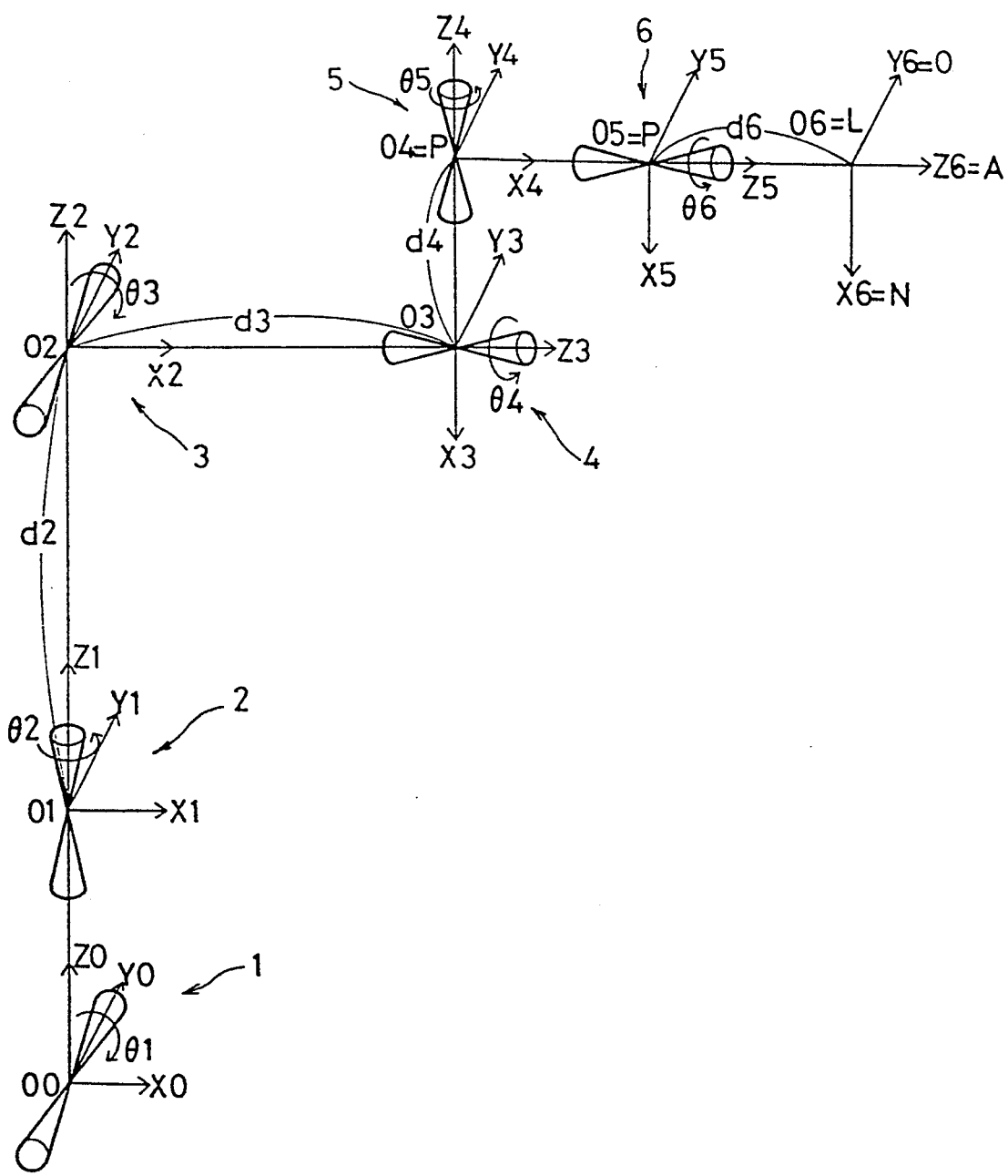
FIG. 1 is a principle view showing a six-axis vertical revolute joint robot having an offset wrist according to an embodiment of the present invention.
Figure 5:
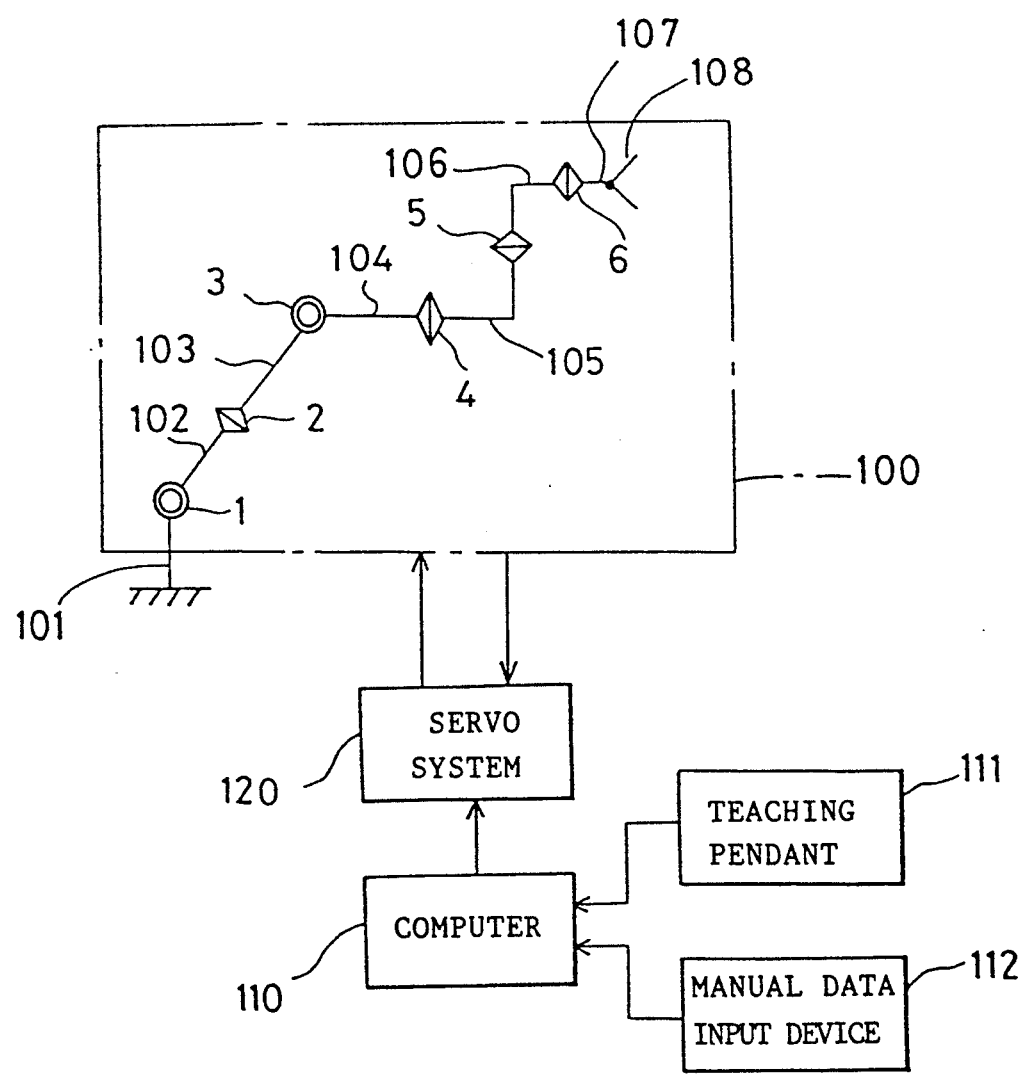
FIG. 5 is a schematic view showing the whole arrangement of the robot of FIG. 1.

Referring to FIGS. 1 and 5, the robot comprises a robot body 100 arranged to be drivingly controlled by a servo system 120, which is operated under the control of a computer 110 to which a teaching pendant 111 and a manual data input device 112 are connected through an input circuit (not shown). The robot body 100 comprises a base 101 fixedly disposed in an operating space, an arm having first to third links 102-104, and an offset wrist having fourth to sixth links 105-107. Adjacent ones of the bases 101 and the links 102-107 are coupled to each other through a corresponding one of revolute joints (hereinafter referred to as joints) 1-6 and an end effector 108 is mounted on the sixth link 107. Further, servomotors (not shown) for rotatively driving the respective joints are individually connected to these joints, and detectors (not shown) for detecting the rotational positions of the respective servomotors are mounted on these motors, respectively. The servomotors and the detectors are connected to the servo system 120.

Figure 3:
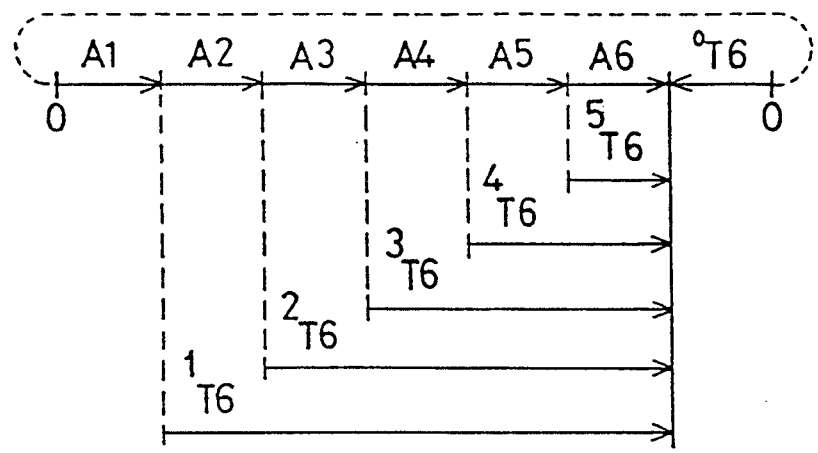
FIG. 3 is a view showing a relationship established between coordinate transformation matrices.

As compared with the conventional robot of FIG. 2, the robot body 100 according to the present embodiment is different therefrom in that the joint axis (Y0 axis) of the first joint 1 extends perpendicularly to the axial direction of the base 101 (extends horizontally), and in that the joint axis (Z1 axis) of the second joint 2 extends in the axial direction of the first link 102 (extends vertically). Due to these differences, the following transformation matrices A1, A2, $^1T_6$, and $^0T_6$, among the transformation matrices Ai and $^{i-1}T_i$ in the robot of this embodiment, are different from conventional ones.

$$A1 = \begin{pmatrix} c1 & 0 & s1 & 0 \\ 0 & 1 & 0 & 0 \\ -s1 & 0 & c1 & 0 \\ 0 & 0 & 0 & 1 \end{pmatrix}$$

$$A2 = \begin{pmatrix} c2 & -s2 & 0 & 0 \\ s2 & c2 & 0 & 0 \\ 0 & 0 & 1 & 0 \\ 0 & 0 & 0 & 1 \end{pmatrix} \begin{pmatrix} 1 & 0 & 0 & 0 \\ 0 & 1 & 0 & 0 \\ 0 & 0 & 1 & d2 \\ 0 & 0 & 0 & 1 \end{pmatrix} = \begin{pmatrix} c2 & -s2 & 0 & 0 \\ s2 & c2 & 0 & 0 \\ 0 & 0 & 1 & d2 \\ 0 & 0 & 0 & 1 \end{pmatrix}$$

$$^1T_6 = A2\,{}^2T_6 =$$

$$\begin{pmatrix} c2\{s3(s4c5s6 - c4c6) - c3s5s6\} - s2(c4c5s6 + s4c6) \\ s2\{s3(s4c5s6 - c4c6) - c3s5s6\} + c2(c4c5s6 + s4c6) \\ c3(s4c5s6 - c4c6) + s3s5s6 \\ 0 \end{pmatrix}$$

$$\begin{matrix} c2\{s3(s4c5c6 + c4s6) - c3s5c6\} - s2(c4c5c6 + s4s6) \\ s2\{s3(s4c5c6 + c4s6) - c3s5c6\} + c2(c4c5c6 + s4s6) \\ c3(s4c5c6 + c4s6) + s3s5c6 \\ 0 \end{matrix}$$

$$\begin{matrix} c2(s3S4S5 + c3c5) - s2c4s5 & c2(c3d3 + s3c4d4) + s2s4d4 \\ s2(s3S4S5 + c3c5) + c2c4s5 & s2(c3d3 + s3c4d4) - c2s4d4 \\ c3s4s5 - s3c5 & d2 - s3d3 + c3c4d4 \\ 0 & 1 \end{matrix} \Bigg)$$

$$^0T_6 = A1\,{}^1T_6 = \begin{pmatrix} nx & ox & ax & px \\ ny & oy & ay & py \\ nz & oz & az & pz \\ 0 & 0 & 0 & 1 \end{pmatrix}$$

where $nx = c1[c2\{s3(s4c5s6-c4c6)-c3s5s6\}-s2(c4c5s6+s4c6)]+s1\{c3(s4c5s6-c4c6)+s3s5s6\}$ $ny = s2\{s3(s4c5s6-c4c6)-c3s5s6\}+c2(c4c5s6+s4c6)$ $nz = -s1[c2\{s3(s4c5s6-c4c6)-c3s5s6\}-s2(c4c5c6-s4c6)]+c1\{c3(s4c5s6-c4c6)+s3s5s6\}$ $ox = c1[c2\{s3(s4c5c6+c4s6)-c3s5c6\}-s2(c4c5c6-s4s6)]+s1\{c3(s4c5c6+c4s6)+s3s5c6\}$ $oy = s2\{s3(s4c5c6+c4s6)-c3s5c6\}+c2(c4c5c6-s4s6)$ $oz = s1[c2\{s3(s4c5s6+c4s6)-c3s5c6\}-s2(c4c5c6-s4s6)]+c1\{c3(s4c5c6+c4s6)+s3s5c6\}$ $ax = c1\{c2(s3s4s5+c3c5)-s2c4s5\}+s1(c3s4s5-s3c5)$ $ay = s2(s3c4s5+c3c5)+c2c4s5$ $az = -s1\{c2(s3s4s5+c3c5)-s2c4s5\}+c1(c3s4s5-s3c5)$ $px = c1\{c2(c3d3+s3c4d4)+s2s4d4\}+s1\{d2-s3d3+c3c4d4\}$ $py = s2(c3d3+s3c4d4)-c2s4d4$ $pz = -s1\{c2(c3d3+s3c4d4)+s2s4d4\}+c1(d2-s3d3+c3c4d4)$ Further, the following relationship is fulfilled between the inverse matrix $[A]^{-1}$ of the transformation matrix A and the transformation matrix T (see, FIG. 3).

$$[A1]^{-1}\,{}^0T_6 = {}^1T_6 \quad (5)$$

Left-hand side =

$$\begin{pmatrix} c1nx - s1nz & c1ox - s1oz & c1ax - s1az & c1px - s1pz \\ ny & oy & ay & py \\ s1nx + c1nz & s1ox + c1oz & s1ax + c1az & s1px + c1pz \\ 0 & 0 & 0 & 1 \end{pmatrix}$$

$$[A2]^{-1} [A1]^{-1} \,{}^0T_6 = {}^2T_6 \tag{6}$$

Left-hand side = $\begin{pmatrix} c2 & s2 & 0 & 0 \\ -s2 & c2 & 0 & 0 \\ 0 & 0 & 1 & -d2 \\ 0 & 0 & 0 & 1 \end{pmatrix} \times$ $$\begin{pmatrix} c1nx - s1nz & c1ox - s1oz & c1ax - s1az & c1px - s1pz \\ ny & oy & ay & py \\ s1nx + c1nz & s1ox + c1oz & s1ax + c1az & s1px + c1pz \\ 0 & 0 & 0 & 1 \end{pmatrix} =$$

$$\begin{pmatrix} c2(c1nx - s1nz) + s2ny & c2(c1ox - s1oz) + s2oy \\ -s2(c1nx - s1nz) + c2ny & -s2(c1ox - s1oz) + c2oy \\ s1nx + c1nz & s1ox + c1oz \\ 0 & 0 \end{pmatrix}$$

$$\begin{pmatrix} c2(c1ax - s1az) + s2ay & c2(c1px - s1pz) + s2py \\ -s2(c1ax - s1az) + c2ay & -s2(c1px - s1pz) + c2py \\ s1ax + c1az & s1px + c1pz - d2 \\ 0 & 1 \end{pmatrix}$$

Figure 4:
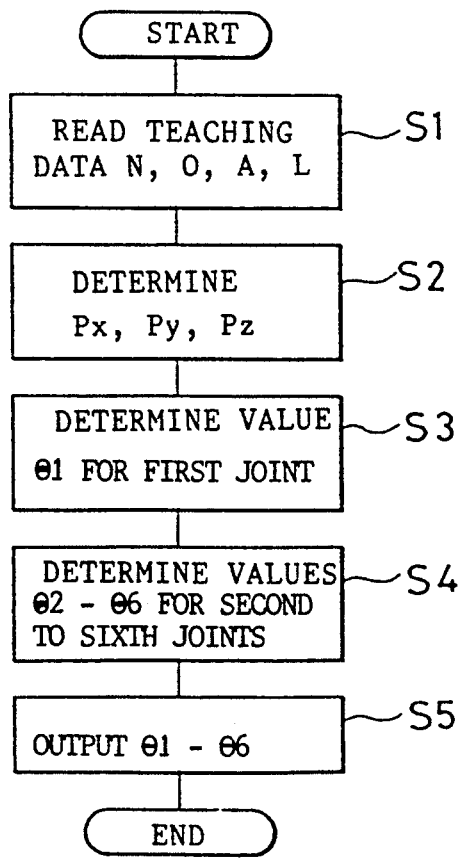
FIG. 4 is a flowchart showing a process for calculation of joint angles in the robot of FIG. 1.

In the following, the operation of the six-axis vertical revolute joint robot constructed as above will be explained with reference to FIG. 4.

Prior to robot working, an operator operates the manual data input device 112 to input various parameters, including the link lengths, etc., employed for the below-mentioned joint angle calculation process, and causes the end effector 108 to be located at required positions in sequence, and further effects conventionally known teaching through the teaching pendant 111, with the end effector caused to assume required orientation at its respective position. As a consequence, teaching data is stored in a memory (not shown) accommodated in the computer 110, which data includes the normal vector n, orientation vector o, approach vector a and location vector 1 indicative of target position and orientation of the end effector 108 at the respective teaching position. Furthermore, a teaching program including the teaching data is prepared, if necessary.

Upon start of the robot operation, a central processing unit (hereinafter referred to as CPU), not shown, accommodated in the computer 110 reads out the various vectors n, o, a, 1 associated with the start point of a first block of a control program from the memory or from the teaching program (step S1). Then, at step S2, the CPU calculates the px, py and pz components of the position vector p indicative of the position of the origin of the sixth coordinate system with respect to the zeroth coordinate system in accordance with equation (7), shown hereinbelow, which has been already explained with reference to FIG. 2:

$$\begin{aligned} px &= 1x - axd6 \\ py &= 1y - ayd6 \\ pz &= 1z - azd6 \end{aligned} \tag{7}$$

Then, the CPU calculates a target value of the first joint angle $\theta 1$ in accordance with the following equation (8) (step S3).

$$s1px + c1pz = \{px^2 + py^2 + pz^2 + d2^2 - (d3^2 + d4^2)\}/2 \cdot d2 \tag{8}$$

Equation (8) is obtained by rearranging the following equation, which is obtained by equating the sum of the squares of the respective elements in first row, fourth column, in second row, fourth column and in third row, fourth column on the left-hand side of equation (6) with that on the right-hand side thereof (see, equation (1) for the right-hand side). Equation (8) is represented as a function solely of the position vector components px, py, pz calculated at step S2 and the link lengths d2, d3 and the offset distance d4. Hence, the first joint angle $\theta 1$ can be easily calculated in accordance with equation (8).

$$\theta 1 = \mathrm{atan}\{px^2 + py^2 + pz^2 + d2^2 - d3^2 - d4^2, \pm (3d2^2 + d3^2 + d4^2 - px^2 - py^2 - pz^2)^{\frac{1}{2}}\} - \mathrm{atan}(pz, px)$$

Then, target values of the second to sixth joint angles $\theta 2\text{-}\theta 6$ are calculated, at step S4, on the basis of the target value of the first joint angle $\theta 1$ determined at step S3 and the relationship established below the reverse matrix $[Ai]^{-1}$ and the transformation matrix $^{i-1}T_i$, which relationship, shown below, has been already explained with reference to FIG. 2:

$$[A3]^{-1} [A2]^{-1} [A1]^{-1} \,{}^0T_6 = {}^3T_6$$

$$[A4]^{-1} [A3]^{-1} [A2]^{-1} [A1]^{-1} \,{}^0T_6 = {}^4T_6$$

$$[A5]^{-1} [A4]^{-1} [A3]^{-1} [A2]^{-1} [A1]^{-1} \,{}^0T_6 = {}^5T_6$$

When control outputs indicative of the thus calculated target values of the joint angles $\theta 1\text{-}\theta 6$ are delivered from the computer 110 to the servo system 120 through an output circuit, not shown (step S5), the servo system 120 drivingly controls the servomotors associated with the respective axes of the robot body 100 so as to control the actual joint angles to these target values.

Although illustrative is omitted here, the CPU repetitively executes the aforesaid joint angle calculation process at predetermined intervals of cycle. Namely, instead of executing step S1, the CPU performs conventionally known interpolation process on the basis of teaching data indicative of the start and end points associated with a block which is read at step S1, so as to calculate the target position and orientation of the end effector at a corresponding one of interpolation points on the moving path of the end effector, and further executes the aforesaid step S2–S5 based upon the calculated target position and orientation.

I claim:
1. A vertical revolute joint robot including:
   a first link,
   a base,
   a first revolute joint coupling said first link to said base,
   a second link,
   a second revolute joint coupling said second link to said first link, and
   a third link
   a third revolute joint coupling said third link to said second link;

an offset wrist, mounted to said arm, including a plurality of revolute joints where at least two axes of said revolute joints are parallel to each other;

an end effector, having a target position and an orientation, mounted at an end of said offset wrist; and control means for calculating joint angles of the respective first, second, third and plurality of revolute joints based on the target position and the orientation of said end effector and previously calculated joint angles;

said first and second revolute joints having joint axes which respectively extend perpendicular to an axis of said base and along an axis of said first link.

2. A vertical revolute joint robot according to claim 1, wherein each of said first, second, third and plurality of revolute joints has a coordinate system associated therewith and wherein said control means includes means for calculating a joint angle in accordance with a predetermined arithmetic equation which uses transformation matrices employed for coordinate transformation between adjacent ones of the coordinate systems respectively set for said revolute joints.

3. A vertical revolute joint robot according to claim 2, wherein said base has a fixed position and wherein said calculating means includes means for calculating an angle of said first revolute joint based on the target position and orientation of said end effector and $$-(\sin \theta_1) P_x + (\cos \theta_1) P_y = 0$$

where $\theta_1$ equals the angle of said first revolute joint, $P_x$ and $P_y$ are position vectors of said end effector in relation to the fixed position of said base.

4. A vertical revolute joint robot according to claim 3, wherein said base has a first axial direction and said first link has a second axial direction, and wherein said first joint has a joint axis which extends perpendicularly to the first axial direction, and said second joint has a joint axis which extends in the second axial direction.

5. A vertical revolute joint robot, comprising:

a base;

a plurality of links;

an end effector having a target position and an orientation;

a plurality of revolute joints, coupling said base to a first one of said links, coupling said first one of said links to at least another one of said links, and coupling said end effector to said at least another one of said links; and calculating means for calculating joint angles of said plurality of revolute joints based on the target position and the orientation of said end effector.

6. A vertical revolute joint robot according to claim 5, wherein said calculating means includes means for calculating the joint angles of said plurality of revolute joints based upon previously calculated joint angles of said plurality of revolute joints; and detector means for detecting a rotational position of said corresponding servomotor means for each of said first through sixth revolute joints.

7. A vertical revolute joint robot according to claim 5, further comprising:

a plurality of servomotor means for rotatively driving a corresponding one of said plurality of revolute joints; and detecting means for detecting a rotational position of said corresponding servomotor means for each of said plurality of revolute joints.

* * * * *

UNITED STATES PATENT AND TRADEMARK OFFICE
CERTIFICATE OF CORRECTION

PATENT NO. : 5,065,337
DATED : November 12, 1991
INVENTOR(S) : Ryuichi Hara

Page 1 of 2

It is certified that error appears in the above-identified patent and that said Letters Patent is hereby corrected as shown below:

Title page, under Abstract, lines 6 & 7 should be continuous paragraph.

line 7, "consists of" should be --comprises--;

line 10, "base, whereas" should be --base. whereas--;

line 16, "fist" should be --first--;

line 21, "(6) and )" should be --(6)--. The computer also calculates--;

UNITED STATES PATENT AND TRADEMARK OFFICE
CERTIFICATE OF CORRECTION

PATENT NO. : 5,065,337
DATED : November 12, 1991
INVENTOR(S) : Ryuichi Hara

It is certified that error appears in the above-identified patent and that said Letters Patent is hereby corrected as shown below:

Column 1, line 47, "at" should be --as--;

Column 2, line 29, "the" (1st occurrence) should be --to--;

Column 3, line 52, "θ1" should be --θi--;

Column 4, line 10, "di" should be --d1--;

Column 10, line 26, "below" should be --between--;

line 44, "illustrative" should be --illustration--

Signed and Sealed this

Thirteenth Day of April, 1993

Attest:

STEPHEN G. KUNIN

*Attesting Officer*      *Acting Commissioner of Patents and Trademarks*